United States Patent [19]
Denis et al.

[11] 3,764,701
[45] Oct. 9, 1973

[54] METHOD
[75] Inventors: Jean-Claude Denis; Jerome Rambaud, both of Paris, France
[73] Assignee: Paul Coirre, Ville d'Avray, France
[22] Filed: Feb. 10, 1969
[21] Appl. No.: 798,180

[52] U.S. Cl. .................................. 424/317, 260/521
[51] Int. Cl. .............................................. A61k 27/00
[58] Field of Search .................................. 424/317

[56] References Cited
OTHER PUBLICATIONS
Chem-Abst. 63, 13117b (1965).
Chem-Abst., 59 2080a (1963).
Satloff, Amer. J. Psychiat. 124:6, December 1967, p. 862.
Gershon, Amer. J. Psychiat. 124:10, April 1968, pp. 1452–1456.

*Primary Examiner*—Stanley J. Friedman
*Attorney*—Irving M. Weiner

[57] ABSTRACT

Lithium parachlorophenoxyacetate is a novel medicament active in the treatment of mental diseases. It is prepared by reacting parachlorophenoxyacetic acid with lithium carbonate.

1 Claim, No Drawings

METHOD

BACKGROUND AND SUMMARY OF THE INVENTION

The present invention consists of a medicament positively active in the treatment of mental diseases and obtained by synthesis from a vegetable growth factor, namely parachlorophenoxyacetic acid, and lithium carbonate. This medicament is lithium parachlorophenoxyacetate.

The method of preparing a compound according to this invention consists in reacting the vegetable growth factor with lithium carbonate in an aqueous medium and subsequently evaporating the resulting solution for collecting the product thus obtained which is eventually crystallized.

DETAILED DESCRIPTION OF THE INVENTION

Lithium parachlorophenoxyacetate (or PC 67.8) is described in greater detail hereinafter:
1. Physico-chemical characteristics
a. Formula

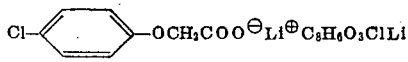

M. W. = 192
M. P. = 210° to 214°C (capillary tube).
b. Method of preparing the compound In a one-liter Erlenmeyer flask equipped with a magnetic stirrer and containing a 62.2 g-suspension of parachlorophenoxyacetic acid in 200 ml of water, 12.4 g of $Li_2CO_3$ are added by small amounts while stirring during about one hour. After completing the addition of $Li_2CO_3$ the mix is stirred until a clear solution is obtained; then this solution is evaporated in vacuo and the resulting product is crystallized by using 200 ml of methanol. This crystallization is facilitated by using a few c.c. of ethyl ether. After centrifugating and drying these crystals in vacuo, 50 g of lithium parachlorophenoxyacetate are obtained.

2. Pharmacological properties

The toxicity of PC 67.8 is relatively low (a 50 1. d. calculated during 5 days with mice amounted to 1,600 mg/kg).

The conventional tests for studying the psychomotive behavior in the animal were used, notably the examination of the behavior of an animal placed in a new environment (cylindrical box or perforated board).

The time required for exploring the new environment, the number of passages of the animal across the beam of photoelectric cells, the number of holes explored by the animal with its muzzle, constituted the essential parameters whereby the activity of PC 67.8 was converted into statistical figures. Throughout these tests a sedative and antiolytic action was observed.

These studies were completed by the X-ray encephalographic examination which confirmed the results and proved in addition that the reactions to proprioceptive stimulations were extended.

3. Therapeutic applications

The above-described products were utilized in the treatment of psychiatric diseases of the depressive type, and also of certain psychoses, notably the maniacodepressive psychosis.

4. Pharmaceutic forms

The products may be administered by the oral route, or in the form of injections, by the rectal route, or in any pharmaceutically acceptable form.

The useful dose of the active products for human therapy ranges from 100 to 500 mg per day, according to cases.

What I claim is:

1. A method of treating psychiatric diseases of the depressive type and also of certain psychoses, notably the maniaco-depressive psychosis, consisting of administering to a human being from 100 to 500 milligrams daily of lithium parachlorophenoxyacetate.

* * * * *